UNITED STATES PATENT OFFICE.

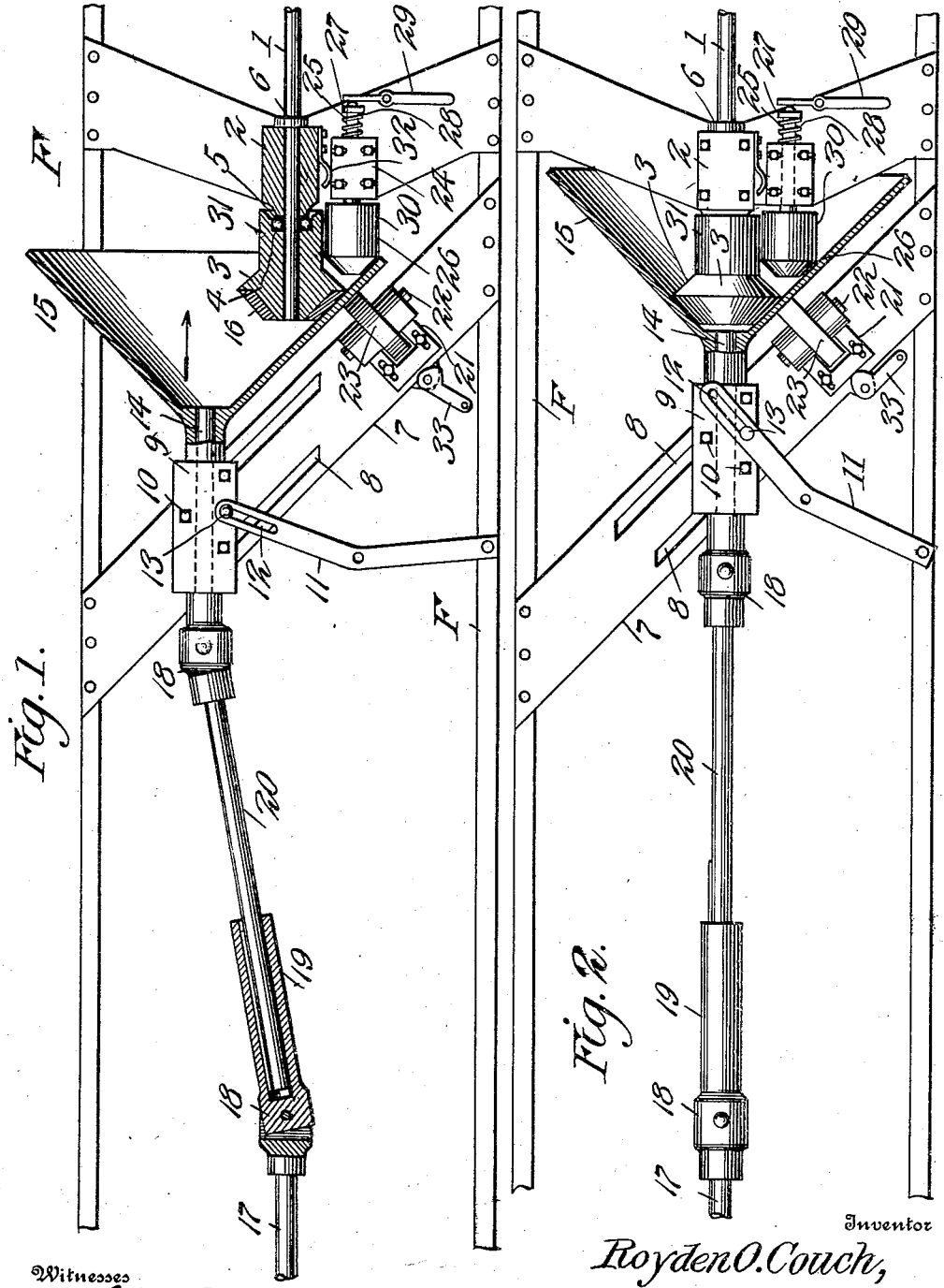

ROYDEN O. COUCH, OF CHARLESTON, WEST VIRGINIA.

VARIABLE-SPEED GEAR.

No. 898,327.

Specification of Letters Patent.

Patented Sept. 8, 1908.

Application filed October 12, 1907. Serial No. 397,138.

*To all whom it may concern:*

Be it known that I, ROYDEN O. COUCH, a citizen of the United States, residing at Charleston, in the county of Kanawha and State of West Virginia, have invented new and useful Improvements in Variable-Speed Gear, of which the following is a specification.

This invention relates to variable speed gears for the transmission of power in automobiles and motor vehicles and all kinds of machinery where it is desired to control the variation of speed; and the invention has for its object to provide an improved friction gearing for the transmission of power whereby the speed may be positively and quickly controlled.

With these and other ends in view which will readily appear as the nature of the invention is better understood, the same consists in the improved construction and novel arrangement and combination of parts which will be fully hereinafter described and pointed out in the claims.

In the accompanying drawings has been illustrated a simple and preferred form of the invention; it being, however, understood that no limitation is necessarily made to the precise structural details therein exhibited, but that changes, alterations and modifications within the scope of the claims may be resorted to when desired.

In the drawings: Figure 1 is a plan view partly in section of a transmission gearing constructed in accordance with the invention, the parts being positioned for the transmission of power at relatively low speed. Fig. 2 is a similar view showing the parts positioned for the transmission of power at high speed.

Corresponding parts in the several figures are denoted by like characters of reference.

The main line shaft 1 which is supported for rotation in a suitable bearing 2 is driven from any suitable source of power, not shown. Said line shaft carries at one end a cone pulley 3, and it also has a ball race 4 wherein anti-friction balls 5 are mounted for engagement with the bearing 2; the opposite end of said bearing is engaged by a thrust collar 6 upon the line shaft, whereby longitudinal movement of said line shaft is prevented. The bearing 2 is supported in a frame F which includes an obliquely disposed cross bar 7 having slots 8 and supporting a slidable box 9 which is provided with connecting members, such as bolts 10 engaging the slots 8 whereby said box is guided for movement upon the oblique supporting member 7. An adjusting lever 11 is provided having a slot 12 that engages a pin 13 upon the box 9, which latter, by means of the lever 11, may be moved to various positions upon the bar or supporting member 7. Suitable means may be provided to retain the lever 11 and related parts at various adjustments; but such retaining means are well known in the art, and it has been deemed unnecessary to illustrate the same.

Supported for rotation in the box 9 is a shaft 14 carrying a large driving cone or conical disk 15, the inner face of which is engaged by the cone pulley 3 which latter is provided with a facing or wear surface 16 of leather, indurated fiber or other suitable material which will provide for a good degree of friction without subjecting the parts to excessive wear. The shaft 14 is connected with the shaft 17 that is to be driven by means including a pair of knuckles or universal joints 18, a sleeve 19, and a shaft section 20 telescoping in the sleeve; said parts being provided in order to enable motion to be transmitted in various positions of the shaft 14 carrying the friction cone 15. It is obvious that the driven shaft 17 may or may not be located in alinement with the shaft 1, which is driven from the source of power and from which motion is transmitted to the said shaft 17.

The frame bar 7 supports a slidable box 21 having bearings for a shaft 22 carrying a pressure roller 23 which is adapted to press exteriorly against the friction cone 15, near the rim or free edge of the latter. Supported slidably in a bearing 24 upon the frame F, adjacent to the bearing 2 of the shaft 1, is a shaft 25 carrying a cone pulley 26 which is adapted to engage the friction cone 15 interiorly, at a point nearly opposite to the pulley 23. The shaft 25 has a collar 27 between which and the bearing box 24 there is interposed a spring 28 actuating the shaft 25 to hold the pulley 26 normally out of engagement with the friction cone 15, but by means of a suitably supported lever 29 the shaft 25 may be moved against the tension of the spring 28 to place the cone pulley 26 in active engagement with the friction cone 15. The shaft 25 having the cone pulley 26 also carries a cylindrical pulley, 30, adapted for engagement with a similar cylindrical pulley 31 upon the shaft 1, adjacent to the rear side of the cone pulley 3. The box or bearing 24 carrying the shaft 25 is capable of a limited sliding movement laterally, and a flat spring, 32, interposed between the boxes 2 and 24 serves to force the latter normally in an outward direction, away from the former. When the shaft 25 is moved against the tension of the spring 28 to place the cone pulley 26 in engagement with the friction cone 15, the pressure of the latter upon the pulley 26 will effect a lateral movement of the box 24 against the tension of the spring 32 until the pulley 30 frictionally engages the pulley 31, and the pulley 26 will thus constitute a reversing medium whereby the direction of the motion transmitted may be reversed in transmission.

From the foregoing description taken in connection with the drawings hereto annexed, the operation and advantages of this invention will be readily understood by those skilled in the art to which it appertains.

In Fig. 1 of the drawings the friction cone has been shown in a position where the rim or edge of said cone may be engaged by the cone pulley 3 which is mounted upon the driven shaft 1; it is obvious that in this position several rotations of the shaft 1 will be needed to accomplish one rotation of the shaft 14, and the transmission of power will therefore be at a low rate of speed; the transmission of power being effected by adjusting the slidable box carrying the pulley 23 until the friction cone is clamped between said pulley 23 and the cone pulley 3; adjustment of the box 21 being effected by means of a suitable cam lever 33. The speed of the transmission may be increased by moving the friction cone 15 in the direction indicated by an arrow in Fig. 1, the movement being readily effected by means of the lever 11. The maximum speed is attained when the parts are in the position shown in Fig. 2 where the cone pulley 3 is at the inner extremity of the friction cone 15. When it is desired to reverse the motion, the pulley 23 is released from engagement with the friction cone, and the lever 29 is actuated to move the shaft 25 against the tension of the spring 28 until the cone pulley 26 engages the friction cone 15, and the cylindrical pulleys 30, 31 are in active frictional contact with each other, thus serving as a medium for the transmission of motion between the shaft 1 and the friction cone, and reversing the movement of the latter. When the lever 29 is released, the parts will be restored to initial position by the action of the springs 28 and 32.

Having thus fully described the invention, what is claimed as new is:—

1. In a device of the class described, a driven shaft, a cone pulley mounted on the driven shaft, a bearing member supported for oblique movement with relation to the driven shaft, a transmission shaft journaled in the bearing member, a friction cone upon the transmission shaft adapted for direct engagement with the cone pulley upon the driven shaft, and a slidably supported pulley arranged adjacent to the pulley upon the driven shaft and adapted to force the friction cone into active engagement therewith.

2. In a device of the class described, a driven shaft support for rotation, a conical friction pulley and a cylindrical friction pulley upon said shaft, an obliquely movable shaft, a friction cone upon the obliquely movable shaft, a longitudinally movable shaft supported adjacent to the main driven shaft, and a cone pulley and a cylindrical pulley upon the longitudinally movable shaft adapted for simultaneous engagement with the cylindrical pulley upon the main driven shaft and with the friction cone upon the obliquely movable shaft.

3. In a device of the class described, a main driven shaft, a cone pulley mounted thereon, an obliquely movable transmission shaft, a friction cone mounted thereon, means for preventing endwise thrust or movement of the main shaft, and friction means for simultaneous engagement with and transmission of motion between the friction-cone and the cone pulley.

4. In a device of the class described, a driven shaft supported for rotation, a conical friction pulley and a cylindrical friction pulley upon said shaft, an obliquely movable shaft, a friction cone upon the obliquely movable shaft, a laterally slidable spring actuated boxing supported adjacent to the main driven shaft, a longitudinally movable spring actuated shaft supported for rotation in said boxing, and a cone pulley and a cylindrical pulley upon the longitudinally movable shaft adapted for simultaneous engagement with the cylindrical pulley upon the main driven shaft and with the friction cone upon the obliquely movable shaft.

In testimony whereof I affix my signature in presence of two witnesses.

ROYDEN O. COUCH.

Witnesses:
  C. V. RODES,
  P. WOOLFOLK.